United States Patent
Takahashi

(10) Patent No.: US 9,743,336 B2
(45) Date of Patent: Aug. 22, 2017

(54) COMMUNICATION APPARATUS, COMMUNICATION SYSTEM, AND COMMUNICATION METHOD

(71) Applicant: Hideaki Takahashi, Minato-ku (JP)

(72) Inventor: Hideaki Takahashi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 189 days.

(21) Appl. No.: 14/734,507

(22) Filed: Jun. 9, 2015

(65) Prior Publication Data

US 2015/0271734 A1    Sep. 24, 2015

Related U.S. Application Data

(62) Division of application No. 13/520,752, filed as application No. PCT/JP2011/050075 on Jan. 6, 2011, now Pat. No. 9,294,984.

(30) Foreign Application Priority Data

Jan. 6, 2010 (JP) ................................ 2010-001124
Jan. 5, 2011 (JP) ................................ 2011-000819

(51) Int. Cl.
*H04W 40/20* (2009.01)
*H04W 4/04* (2009.01)
(Continued)

(52) U.S. Cl.
CPC ............. *H04W 40/20* (2013.01); *H04W 4/04* (2013.01); *H04W 4/046* (2013.01); *H04W 76/02* (2013.01); *H04W 64/00* (2013.01)

(58) Field of Classification Search
CPC ....... H04W 40/20; H04W 4/04; H04W 4/046; H04W 76/02
(Continued)

(56) References Cited

U.S. PATENT DOCUMENTS 7,525,933 B1    4/2009  Hall
7,917,169 B1    3/2011  Hall
(Continued)

FOREIGN PATENT DOCUMENTS

JP    2005-045340 A    2/2005
JP    2005-244873 A    9/2005
(Continued)

OTHER PUBLICATIONS

Communication dated Sep. 13, 2016 from the U.S. Patent and Trademark Office in counterpart U.S. Appl. No. 14/734,762.
(Continued)

*Primary Examiner* — Stephen J Clawson
(74) *Attorney, Agent, or Firm* — Sughrue Mion, PLLC

(57) ABSTRACT

The present invention has the object of forwarding packets according to a road line without using road line information while preventing unnecessary forwarding of packets. A communication apparatus includes: a positional information acquisition unit that acquires information that indicates the current position of the communication apparatus and the traveling direction of the vehicle unit; a reception unit that receives from a transmission origin device packets that contain forwarding information that indicates the position of the transmission origin device and the position of the transmission destination; a communication control unit that prevents forwarding of packets when the current position is not within an area from the position of the transmission origin device to the position of the transmission destination; an information processing unit that, when the current position is within the area, extracts, as a corrected position, a position that is specified by the traveling direction among positions that are separated from the current position by a remaining distance between the position of the transmission destination and the current position; and a transmission unit
(Continued)

that transmits packets that include the forwarding information in which the position of the transmission destination is changed to the corrected position and the position of the transmission origin device is changed to the current position.

4 Claims, 11 Drawing Sheets

(51) Int. Cl.
H04W 76/02 (2009.01)
H04W 64/00 (2009.01)

(58) Field of Classification Search
USPC .......................................................... 370/315
See application file for complete search history.

(56) References Cited

U.S. PATENT DOCUMENTS

| | | | |
|---|---|---|---|
| 2005/0110654 A1* | 5/2005 | Kitano | G01C 21/26 340/13.24 |
| 2005/0201316 A1* | 9/2005 | Fukuhara | H04B 7/15521 370/315 |
| 2007/0053307 A1 | 3/2007 | Greene et al. | |
| 2007/0117525 A1* | 5/2007 | Osafune | G08G 1/20 455/99 |
| 2007/0124063 A1* | 5/2007 | Kindo | G01C 21/26 701/517 |
| 2008/0002573 A1 | 1/2008 | Mosko et al. | |
| 2008/0002574 A1 | 1/2008 | Mosko et al. | |
| 2008/0002583 A1 | 1/2008 | Liu et al. | |
| 2008/0002587 A1 | 1/2008 | Liu et al. | |
| 2008/0002635 A1* | 1/2008 | Mosko | H04W 28/14 370/338 |
| 2009/0046628 A1 | 2/2009 | Hall | |
| 2009/0048768 A1* | 2/2009 | Taguchi | G08G 1/166 701/117 |
| 2009/0122738 A1 | 5/2009 | Chen et al. | |
| 2009/0219194 A1 | 9/2009 | Menouar et al. | |
| 2009/0323549 A1 | 12/2009 | Jerbi et al. | |
| 2010/0144283 A1 | 6/2010 | Curcio et al. | |
| 2011/0095909 A1* | 4/2011 | Kushi | G08G 1/161 340/905 |
| 2011/0128138 A1* | 6/2011 | Yamamoto | B60W 30/0956 340/436 |
| 2011/0276220 A1* | 11/2011 | Sato | G08G 1/22 701/31.4 |
| 2012/0012947 A1 | 1/2012 | Fujita et al. | |
| 2012/0028662 A1* | 2/2012 | Nagai | H04L 27/2602 455/500 |
| 2012/0041669 A1* | 2/2012 | Zaitsu | G08G 1/096741 701/117 |
| 2012/0116663 A1* | 5/2012 | Tsunekawa | G08G 1/166 701/300 |
| 2014/0334422 A1* | 11/2014 | Kim | H04W 72/048 370/329 |

FOREIGN PATENT DOCUMENTS

| | | |
|---|---|---|
| JP | 2006-100983 A | 4/2006 |
| JP | 2006-148322 A | 6/2006 |
| JP | 2006-325019 A | 11/2006 |
| JP | 2007-214986 A | 8/2007 |
| JP | 2007-235538 A | 9/2007 |
| JP | 2008-102738 A | 5/2008 |
| JP | 2008-176370 A | 7/2008 |
| JP | 2009-009486 A | 1/2009 |
| JP | 2009-016900 A | 1/2009 |
| JP | 2009-212753 A | 9/2009 |
| JP | 2010-068206 A | 3/2010 |
| WO | 2007/132511 A1 | 11/2007 |
| WO | 2008/092475 A1 | 8/2008 |
| WO | 2010/010651 A1 | 1/2010 |

OTHER PUBLICATIONS

Communication dated May 4, 2017, issued from the European Patent Office in counterpart European Patent Application No. 11731809.7.

Füβler, H. et al., A Novel Forwarding Paradigm for Position-Based Routing (with Implicit Addressing), Computer Communications, IEEE 18th Annual Workshop, pp. 194-200, Oct. 20, 2003 (7 pages total).

* cited by examiner

COMMUNICATION APPARATUS, COMMUNICATION SYSTEM, AND COMMUNICATION METHOD

This is a divisional application based upon U.S. patent application Ser. No. 13/520,752 filed Jul. 5, 2012, which is a National Stage of International Application No. PCT/JP2011/050075 filed Jan. 6, 2011, claiming priority based on Japanese Patent Application Nos. 2011-000819 filed Jan. 5, 2011 and 2010-001124 filed Jan. 6, 2010, the contents of all of which are incorporated herein by reference in their entirety.

TECHNICAL FIELD

The present invention relates to a communication apparatus, a communication system, and a communication method.

BACKGROUND ART

Recent years have seen advances in the introduction of communication systems directed toward reducing traffic accidents by using communication between road and vehicle (a road-side device and a target vehicle) or between vehicle and vehicle (a target vehicle and other vehicles) to report to the target vehicle that is traveling on a road support information for safe driving that indicates, for example, the state of roads in the vicinity or the state of movement of vehicles in the vicinity.

The support information for safe driving that is provided in such a communication system usually takes as targets vehicles that are present in a fixed direction and within a fixed distance from a transmission-origin vehicle that is the transmission origin of information (hereinbelow referred to as "transmitting vehicle"). For example, in one support system that provides information regarding emergency vehicles that is considered as a one vehicle-to-vehicle communication application, information is provided from an emergency vehicle that is the transmitting vehicle to vehicles that are present within a range of approximately 300 m ahead of the emergency vehicle.

Although the use of microwave electromagnetic waves is effective in this communication system, high-frequency electromagnetic waves such as microwaves also have the properties of short propagation distance and high diffraction loss. As a result, the transmitting vehicle is, in some cases, unable to directly communicate with vehicles present within the delivery target area (hereinbelow referred to as the "transmission destination area").

FIG. 1 shows an example of a method for expanding the transmission destination area of the transmitting vehicle. As shown in FIG. 1, vehicle B that is capable of forwarding transmission information that is transmitted from transmitting vehicle A (hereinbelow referred to as "relay vehicle") is able to expand the transmission destination area by successively forwarding the transmission information.

In this case, upon receiving transmission packets in which transmission information is included, relay vehicle B forwards the transmission packets outside the transmission destination area. By being repeatedly carried out by the relay vehicle, this wasteful relay not only increases the communication traffic but also impedes the appropriate delivery of information.

In contrast, a geocast routing method is known that designates the area to which transmission packets are to be forwarded. FIGS. 2 and 3 show example of the designated areas that are designated in this geocast routing method.

FIG. 2 is a conceptual view for a case in which the positional coordinates of four points are used to set a rectangular designated area by the geocast routing method. FIG. 3 is a conceptual view for a case in which a round designated area is set by means of the center coordinates and the radius by the geocast routing method.

As a radio network system that employs the geocast routing method, Patent Document 1 describes a radio network system that uses parameters that indicate the relay direction of packets and the effective width of the relay area in which packets are to be relayed to set a designated area.

In the radio network system described in Patent Document 1, a transmission origin terminal device designates parameters that indicate the relay direction and the effective width of the relay area, appends these parameters (hereinbelow referred to as "designation parameters") to packets, and then transmits the packets. A relay terminal device, upon receiving these packets, judges whether the current position of its vehicle is within the designated area that is determined by the designation parameters. If the current position of its own vehicle is not contained in the designated area, the relay terminal device halts the relay of the packets. As a result, the radio network system is able to decrease wasteful relays by a relay vehicle and thus reduce the congestion of packet transmission.

LITERATURE OF THE PRIOR ART

Patent Documents

Patent Document 1: Japanese Unexamined Patent Application Publication No. 2008-176370

SUMMARY OF THE INVENTION

Problem to be Solved by the Invention

In the radio network system described in Patent Document 1, the transmission origin terminal device is able to prevent unnecessary forwarding of packets by appending designation parameters to packets. However, the designated area that is determined by the designation parameters may vary from the area for which delivery was originally desired due to the movement of the vehicle, which has the transmission origin terminal device, over a road that has curves. As an example, a simple explanation is next given with reference to the next figure regarding a case resulting from a geocast routing method that assumes an emergency vehicle information provision support system.

FIG. 4 shows an example in which a range 300 m ahead of an emergency vehicle is set as the designated area by means of the geocast routing method. As shown in FIG. 4, when the emergency vehicle, which is the transmitting vehicle, approaches the near side of a curve, the designated area diverges from the area for which delivery was originally desired, and as a result, packets cannot be forwarded as far as the area for which delivery was originally desired.

In contrast, as a method for forwarding along a road line packets for which a designated area is set that, according to roadside devices or an onboard device, differs from the road line, a method is considered in which a relay vehicle holds road line information such as map information and updates the designated area in conformance with the road line.

In this case, all relay vehicles must always hold the most recent road line information, and correction of the designated area in conformance with the road line will not be possible in relay vehicles that do not hold road line information. There is the additional problem of the complexity of the process of matching the road line with the designated area in relay vehicles.

It is an object of the present invention to provide a communication apparatus, a communication system, and a communication method that solve the above-described problems.

Means for Solving the Problem

The communication apparatus according to the present invention is a communication apparatus that is installed in a mobile unit and includes:

acquisition means that acquires positional information that indicates the current position of the communication apparatus and traveling direction information that indicates the traveling direction of the mobile unit;

reception means that receives, from a transmission origin device of packets, packets that contain forwarding information that indicates the position of the transmission origin device and the position of the transmission destination for specifying the transmission destination of the packets;

judgment means that, based on the positional information and the forwarding information, determines whether the current position is contained within an area from the position of the transmission origin device up to the position of the transmission destination, and when the current position is determined not to be contained in the area, prevents forwarding of the packets;

correction means that, when it has been determined by the judgment means that the current position is contained in the area, extracts as a corrected position a position specified based on the traveling direction among positions on a circle that is separated from the current position by a remaining distance between the position of the transmission destination and the current position; and transmission means that changes the position of the transmission destination indicated by the forwarding information of the packets to the corrected position, and moreover, that changes the position of the transmission origin device indicated by the forwarding information to the current position, and that transmits packets that contain forwarding information that follows the changes.

The communication system according to the present invention is a communication system having a plurality of communication apparatuses each installed in a mobile unit wherein a transmission origin communication apparatus among the plurality of communication apparatuses transmits packets that contain forwarding information that indicates the position of the transmission origin communication apparatus and the position of the transmission destination for specifying the transmission destination of packets, and a different communication apparatus among the plurality of communication apparatuses includes:

acquisition means that acquires positional information that indicates the current position of the different communication apparatus and traveling direction information that indicates the traveling direction of the mobile unit;

judgment means that, based on the positional information and the forwarding information, judges whether the current position is contained within a range between the position of the transmission origin communication apparatus and the position of the transmission destination, and that, when the current position is judged not to be within the range, prevents the forwarding of the packets;

correction means that, when the current position is judged to be contained within the range by the judgment means, extracts as a corrected position a position that is specified based on the traveling direction among positions on a circle that is separated from the current position by a remaining distance between the position of the transmission destination and the current position; and transmission means that changes the position of the transmission destination indicated by the forwarding information of the packets to the corrected position, and moreover, that changes the position of the transmission origin communication apparatus indicated by the forwarding information to the current position, and that transmits packets that contain forwarding information that follows the changes.

The communication method according to the present invention is a communication method in a communication apparatus that is installed in a mobile unit and includes steps of:

acquiring positional information that indicates the current position of the communication apparatus and traveling direction information that indicates the traveling direction of the mobile unit;

receiving, from a transmission origin device of packets, packets that include forwarding information that indicates the position of the transmission origin device and the position of the transmission destination for specifying the transmission destination of the packets;

based on the positional information and the forwarding information, judging whether the current position is included within a range from the position of the transmission origin device to the position of the transmission destination, and preventing forwarding of the packets when the current position is determined not to be included within the range;

when it is determined that the current position is within the range, extracting as a corrected position a position that is specified based on the traveling direction from among positions on a circle that is separated from the current position by a remaining distance between the position of the transmission destination and the current position;

changing the position of the transmission destination indicated by the forwarding information of the packet to the corrected position, changing the position of the transmission origin device indicated by the forwarding information to the current position, and transmitting packets that include the forwarding information that follows the changes.

The communication method according to the present invention is a communication method in a communication system that has a plurality of communication apparatuses installed in mobile units and includes:

a communication apparatus of a transmission origin communication apparatus among the plurality of communication apparatuses transmitting packets that include forwarding information that indicates the position of the transmission origin communication apparatus and the position of the transmission destination for specifying the transmission destination of the packets;

a different communication apparatus among the plurality of communication apparatuses acquiring positional information that indicates the current position of the different communication apparatus and traveling direction information that indicates the traveling direction of the mobile unit;

the different communication apparatus receiving from the transmission origin communication apparatus packets that contain the forwarding information;

the different communication apparatus, based on the positional information and the forwarding information, judging whether the current position is contained within a range between the position of the transmission origin communication apparatus and the position of the transmission destination and preventing forwarding of the packets when the current position is judged not to be contained within the range;

the different communication apparatus extracting as a corrected position a position that is specified based on the traveling direction from among positions on a circle that is separated from the current position by a remaining distance between the position of the transmission destination and the current position when the current position is judged to not be included within the range; and the different communication apparatus changing the position of the transmission destination indicated by the forwarding information of the packets to the corrected position, and moreover, changing the position of the transmission origin communication apparatus indicated by the forwarding information to the current position, and transmitting packets that contain forwarding information that follows the changes.

A communication apparatus according to the present invention is a communication apparatus that is installed in a mobile unit and includes:

reception means that receives packets that are transmitted from a transmission origin device at prescribed time intervals and that contain forwarding information that includes the transmission direction of the packets being set with a reference direction as a reference and the position of the transmission origin device;

calculation means that calculates as the reference direction the traveling direction of the transmission origin device based on the position of the transmission origin device that is included in the forwarding information in packets that are received by the reception means and the position of the transmission origin device that is included in the forwarding information in packets that were received by the reception means before the packets are received; and transmission means that transmits packets that include the forwarding information in the transmission direction of the packets.

In addition, the communication apparatus according to the present invention is a communication apparatus that is installed in a mobile unit and includes:

reception means that receives, from a transmission origin device of packets, packets that contain forwarding information that contains the traveling direction of the transmission origin device that is indicated as the reference direction and the transmission direction of the packets that is set with the reference direction as a reference;

acquisition means that acquires traveling direction information that indicates the traveling direction of the mobile unit; and transmission means that changes the reference direction that is contained in the forwarding information from the traveling direction of the transmission origin device to the traveling direction of the mobile unit and that transmits the packets that contain forwarding information that follows the change in the transmission direction of packets that is contained in the forwarding information that follows the change.

In addition, the communication method according to the present invention is a communication method in a communication apparatus that is installed in a mobile unit and includes steps of:

receiving packets that are transmitted from a transmission origin device at prescribed time intervals and that contain forwarding information that includes the transmission direction of the packets that is set with a reference direction as a reference and the position of the transmission origin device;

calculating as a reference direction the traveling direction of the transmission origin device based on the position of the transmission origin device that is contained in the forwarding information in the packets and the position of the transmission origin device that is contained by the forwarding information in packets that were received before the packets are received; and transmitting packets in which the forwarding information is contained in the transmission direction of the packets.

In addition, the communication method according to the present invention is a communication method in a communication apparatus that is installed in a mobile unit and includes steps of:

receiving, from the transmission origin device packets, in which forwarding information is contained that contains the traveling direction of the transmission origin device that is indicated as a reference direction and the transmission direction of the packets that is set with the reference direction as a reference;

acquiring traveling direction information that indicates the traveling direction of the mobile unit;

changing the reference direction that is contained in the forwarding information from the traveling direction of the transmission origin device to the traveling direction of the mobile unit; and transmitting packets in which forwarding information that follows the change is included in the packet transmission direction that is included in forwarding information that follows the change.

Effect of the Invention

According to the present invention, packet forwarding can be carried out according to a road line without using road line information while preventing unnecessary packet forwarding.

BEST MODE FOR CARRYING OUT THE INVENTION

Each exemplary embodiment of the present invention is next described with reference to the accompanying drawings.

Figure 1:
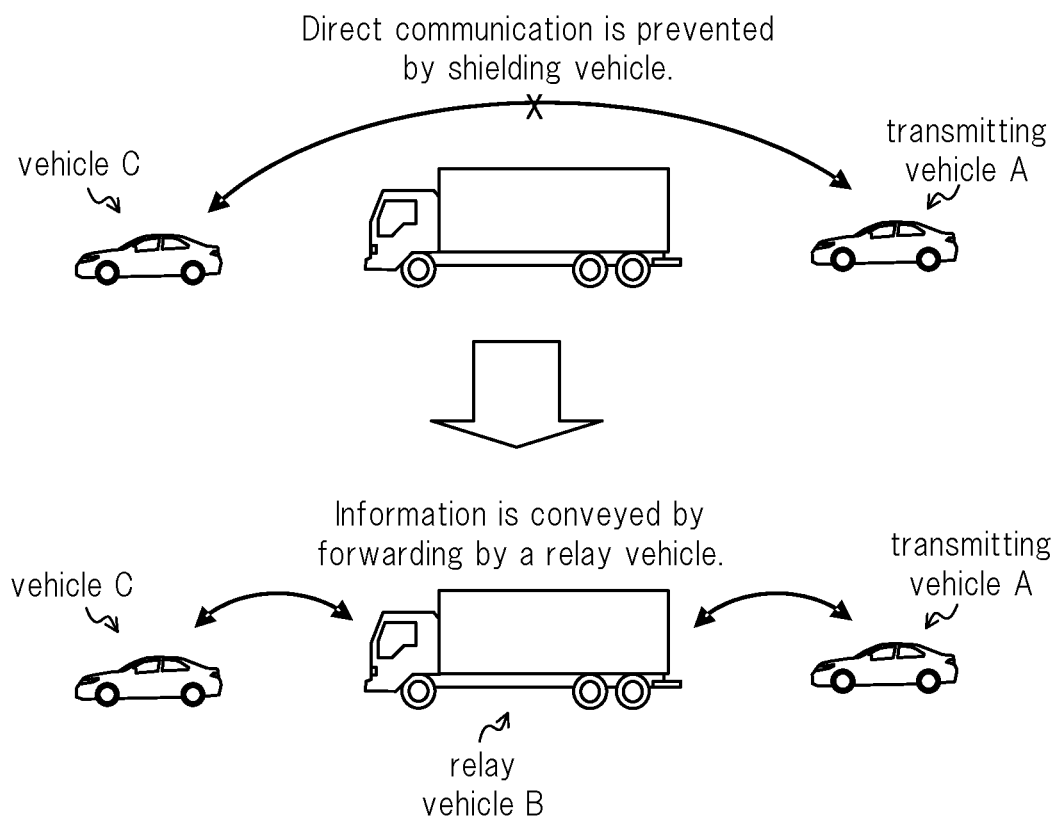
FIG. 1 shows an example of a method for enlarging the transmission destination area of a transmitting vehicle.
Figure 2:
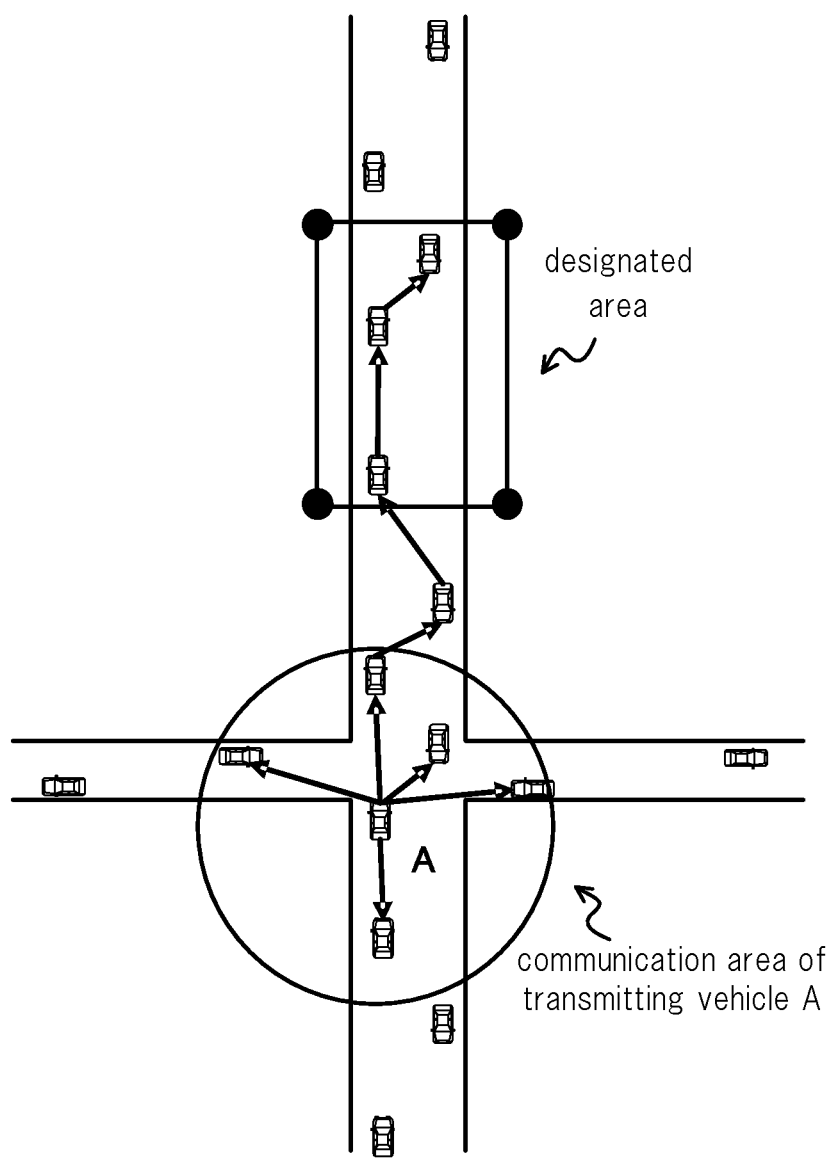
FIG. 2 is a conceptual view of a case in which a rectangular designated area is set by the position coordinates of four points in a geocast routing method.
Figure 3:
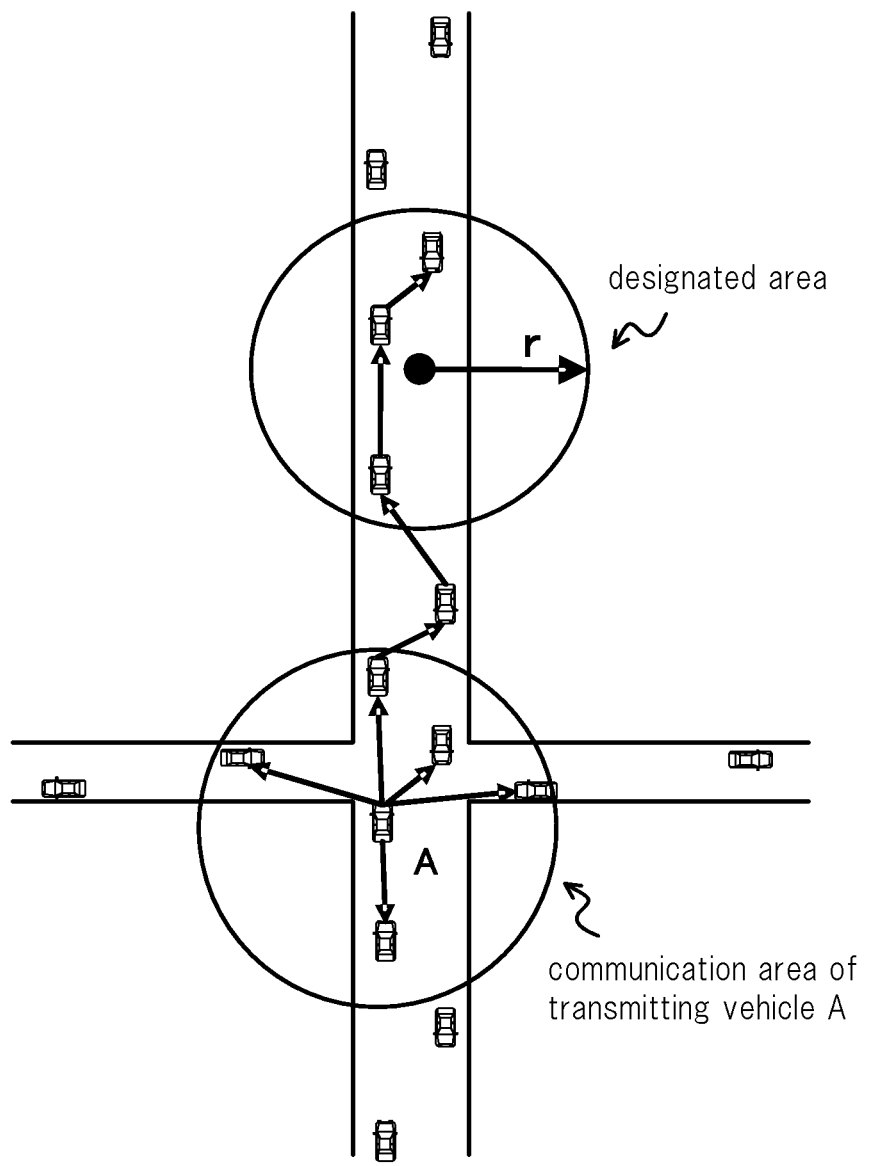
FIG. 3 is a conceptual view of a case in which a circular designated area is set by center coordinates and radius in a geocast routing method.
Figure 4:
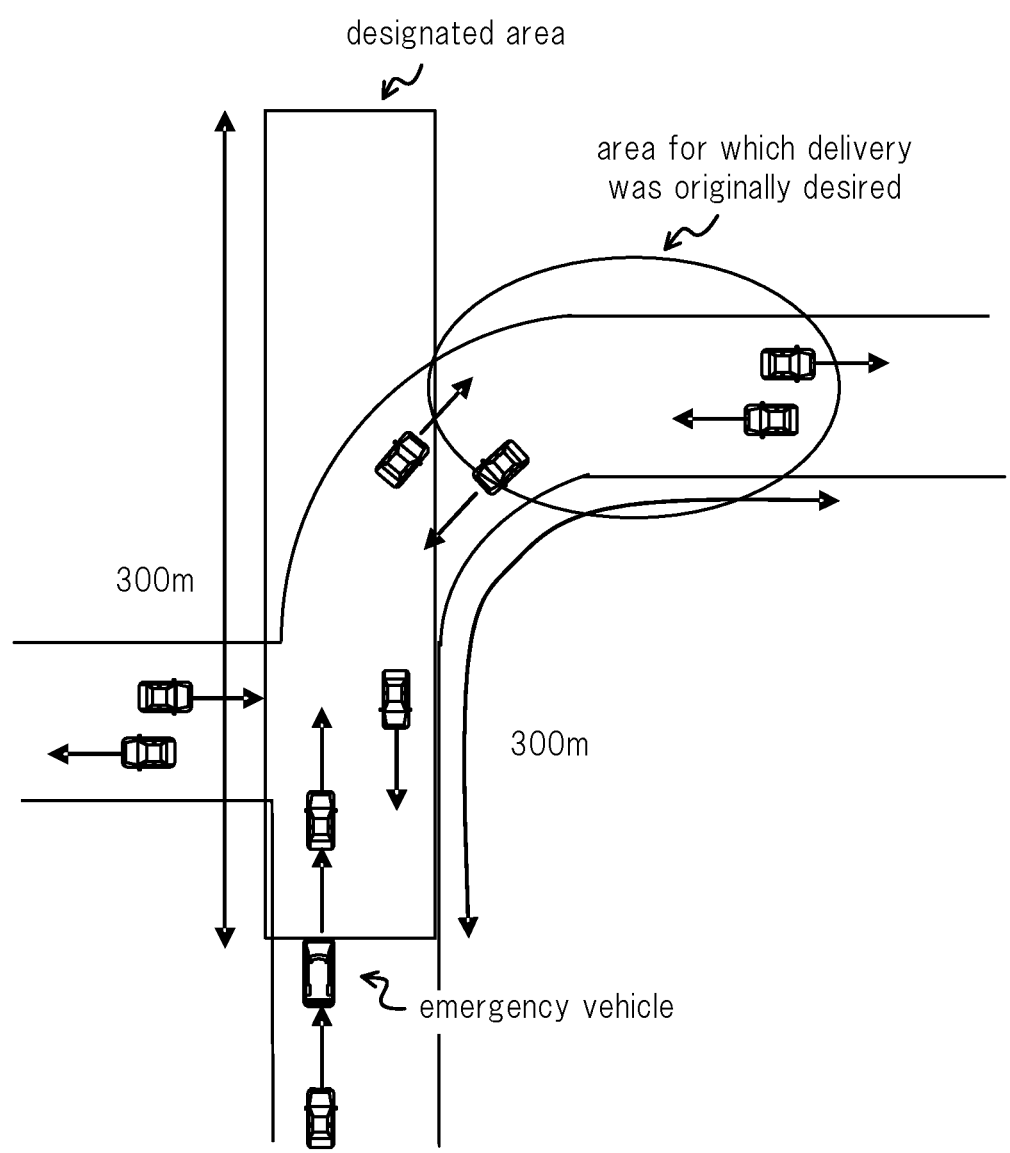
FIG. 4 shows a case in which the range of 300 m ahead of an emergency vehicle is designated as the designated area in a geocast routing method.
Figure 5:
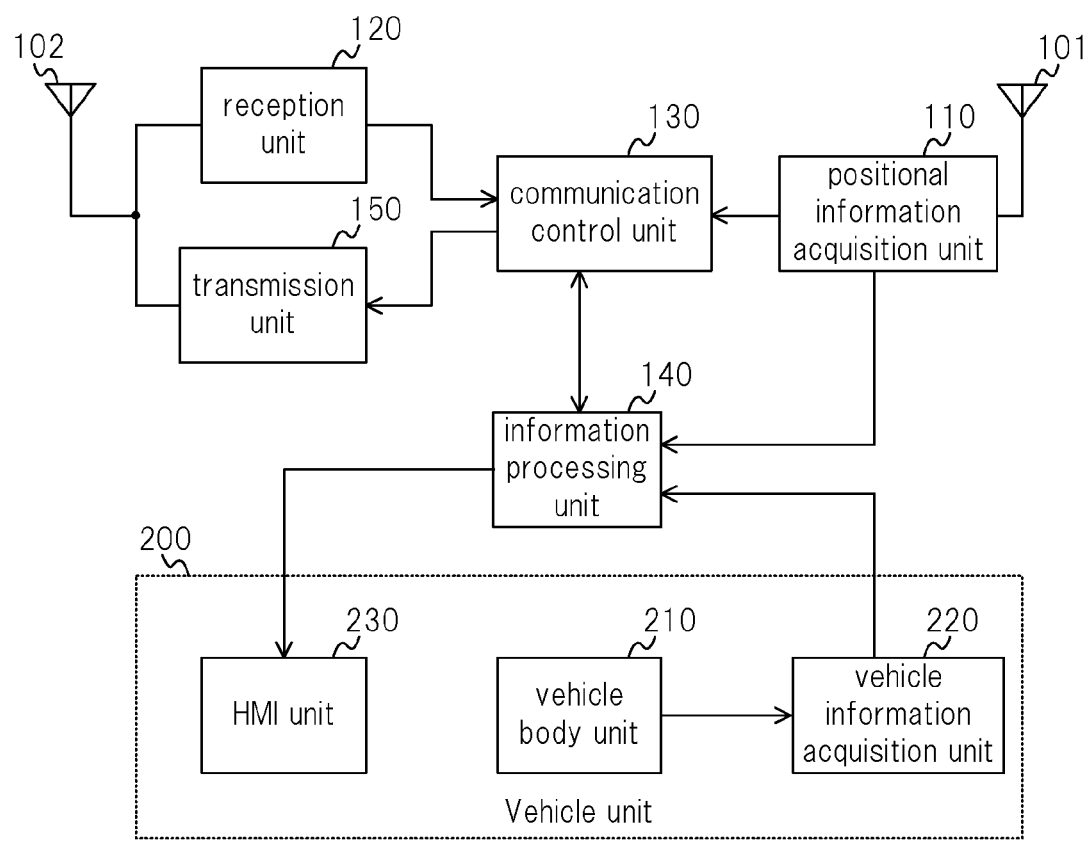
FIG. 5 is a block diagram showing an example of the configuration of a communication apparatus in the first exemplary embodiment of the present invention.

FIG. 5 is a block diagram showing an example of the configuration of a communication apparatus in the first exemplary embodiment of the present invention.

Communication apparatus 100 is installed in vehicle unit 200 and is an on-board device that performs road-to-vehicle communication or vehicle-to-vehicle communication. Communication apparatus 100 is equipped with: positional information acquisition unit 110, reception unit 120, communication control unit 130, information processing unit 140, and transmission unit 150.

Positional information acquisition unit 110 can also typically be referred to as acquisition means.

Positional information acquisition unit 110 acquires, by way of antenna 101, positional information that indicates the current position of communication apparatus 100 (hereinbelow referred to as "its own vehicle position") and traveling direction information that indicates the traveling direction of vehicle unit 200. Positional information acquisition unit 110 uses, for example, a GPS (Global Positioning System) to acquire the positional information. In the present exemplary embodiment, the vehicle position that is indicated in the positional information is expressed by latitude, longitude, and altitude.

In addition, positional information acquisition unit 110 further acquires traveling direction information based on the positional information that was acquired. In the present exemplary embodiment, positional information acquisition unit 110 judges the traveling direction of vehicle unit 200 based on the positional information that is acquired and positional information that was acquired before the time of acquiring this positional information, for example, positional information that was acquired immediately before. Positional information acquisition unit 110 then generates traveling direction information that indicates the judgment result.

In addition, positional information acquisition unit 110 may use an acceleration sensor such as a gyrosensor to acquire the traveling direction information. Positional information acquisition unit 110 further supplies the positional information and traveling direction information that were acquired to communication control unit 130 and information processing unit 140.

Reception unit 120 can also be typically referred to as reception means.

Reception unit 120 receives packets that were issued by electromagnetic waves from another communication apparatus by way of antenna 102. Reception unit 120 receives, from a transmission origin device, packets that contain forwarding information for specifying the area to which packets are to be forwarded (hereinbelow referred to as the "forwarding area") from the transmission origin device to a transmission destination.

In the present exemplary embodiment, reception unit 120 receives packets in which forwarding information is included that indicates the position of the transmission origin device of the packets (hereinbelow referred to as the "transmission origin position") and the position of the transmission destination (hereinbelow referred to as the "transmission destination position") for specifying the transmission destination of the packets as transmission destination coordinates. The transmission origin position and transmission destination position that are indicated in this forwarding information are each expressed by means of latitude, longitude, and altitude.

Reception unit 120 supplies the received packets to communication control unit 130.

Communication control unit 130 can also be typically referred to as judgment means.

Communication control unit 130 judges whether its own vehicle position is included within the forwarding area from the transmission origin position to the transmission destination position based on the positional information and traveling direction information from positional information acquisition unit 110 and the forwarding information contained in the packets from reception unit 120.

When its own vehicle position is judged not to be within the forwarding area, communication control unit 130 prevents the forwarding of packets. In addition, when its own vehicle position is judged to be contained within the forwarding area, communication control unit 130 supplies the forwarding information contained in the packets to information processing unit 140.

In the present exemplary embodiment, communication control unit 130 finds the transmission direction of packets from the transmission origin position to the transmission destination position based on the transmission origin position and transmission destination position indicated by the forwarding information of the packets, and calculates the angle (hereinbelow referred to as the "forwarding angle") that is formed by the transmission direction of the packets and the traveling direction indicated by the traveling direction information. Communication control unit 130 judges whether this forwarding angle exceeds a predetermined threshold value (hereinbelow referred to as the "angle threshold value"). The angle threshold value is stored in, for example, communication control unit 130.

If the forwarding angle exceeds the angle threshold value, communication control unit 130 determines that its own vehicle position is not contained within the forwarding area and prevents the forwarding of packets.

On the other hand, if the forwarding angle does not exceed the angle threshold value, communication control unit 130 determines whether its own vehicle position is present on the transmission direction side from the transmission origin device.

In the present exemplary embodiment, communication control unit 130 calculates the distance (hereinbelow referred to as the "remaining distance") between the transmission origin position that is indicated by the forwarding information and its own vehicle position that is indicated by the positional information and the distance (hereinbelow referred to as the "forwarding distance") between the transmission destination position and the transmission origin position indicated by the forwarding information. Communication control unit 130 then determines whether this remaining distance falls below the forwarding distance.

When the remaining distance is equal to or greater than the forwarding distance, communication control unit 130 judges that its own vehicle position is not on the traveling direction side from the transmission origin device and determines that its own vehicle position is not contained in the forwarding area.

On the other hand, when the remaining distance is less than the forwarding distance, communication control unit 130 judges whether its own vehicle position has reached the transmission destination position.

In the present exemplary embodiment, communication control unit 130 judges whether the distance between the transmission origin position indicated by the forwarding information and its own vehicle position indicated by the positional information (hereinbelow referred to as the "arrival distance") is less than the forwarding distance.

If the arrival distance is equal to or greater than the forwarding distance, communication control unit 130 judges that its own vehicle position has arrived at the transmission destination position and determines that its own vehicle position is not contained in the forwarding area.

On the other hand, if the arrival distance is less than the forwarding distance, communication control unit 130 judges whether vehicle unit 200 of communication apparatus 100 is present on the same road line as the transmission origin vehicle.

In the present exemplary embodiment, communication control unit 130 judges whether the difference between the altitude of the transmission origin position indicated by the forwarding information and the altitude of its own vehicle position indicated by the positional information (hereinbelow referred to as "forwarding altitude difference") falls below a predetermined threshold value (hereinbelow referred to as the "altitude threshold value"). The altitude threshold value is, for example, stored in communication control unit 130.

When the forwarding altitude difference exceeds the altitude threshold value, communication control unit 130 judges that vehicle unit 200 is not present on the same road line as the transmission origin vehicle and determines that its own vehicle position is not contained within the forwarding area.

On the other hand, when the forwarding altitude difference does not exceed the altitude threshold value, communication control unit 130 determines that its own vehicle position is contained within the forwarding area. Communication control unit 130, then supplies the forwarding information of packets for which its own vehicle position has been determined to be contained within the forwarding area and calculation information indicating the remaining distance and transmission direction calculated at the time of the determination, to information processing unit 140.

In addition, when communication control unit 130 has determined that its own vehicle position is contained within the forwarding area, communication control unit 130 supplies the packets for which this determination was made to transmission unit 150. Communication control unit 130 further supplies, for example, information other than the forwarding information that is contained in the packets such as emergency information that indicates that an ambulance is approaching, to information processing unit 140.

Information processing unit 140 can also typically be referred to as correction means.

When communication control unit 130 has determined that its own vehicle position is contained within the forwarding area, information processing unit 140 extracts as the corrected position a position that is specified based on the traveling direction among the positions on a circle separated from its own vehicle position by the remaining distance between the transmission destination position and its own vehicle position.

In the present exemplary embodiment, information processing unit 140 extracts, as the corrected position, a position that is separated from its own vehicle position by a remaining distance for, of the traveling direction and the direction opposite the traveling direction, the direction that is closer to the transmission direction from the transmission origin position to the transmission destination position.

In addition, information processing unit 140 supplies to transmission unit 150 by way of communication control unit 130 correction information that indicates the corrected position that was extracted and its own vehicle position indicated in the positional information.

Transmission unit 150 can also typically be referred to as transmission means.

Transmission unit 150 transmits packets for which communication control unit 130 has determined that its own vehicle position is contained within the forwarding area by means of a radio signal via antenna 102. Transmission unit 150 changes the forwarding information of the packets that are supplied from communication control unit 130 based on the correction information from information processing unit 140.

Transmission unit 150 changes the transmission destination position indicated by the forwarding information of the packets from communication control unit 130 to the corrected position, and moreover, changes the position of the transmission origin device indicated by the forwarding information to its own vehicle position. Transmission unit 150 then transmits the packets that contain the forwarding information that follows these changes.

Vehicle unit 200 is a mobile unit that reports to drivers the information that is supplied from communication apparatus 100 during travel on the road. Vehicle unit 200 is equipped with vehicle body unit 210, vehicle information acquisition unit 220, and HMI unit 230.

Vehicle body unit 210 is an automobile that is traveling on a road under the control of a driver.

Vehicle information acquisition unit 220 acquires vehicle information that relates to the state of vehicle body unit 210. Vehicle information acquisition unit 220 supplies this vehicle information to information processing unit 140.

HMI (Human Machine Interface) unit 230 reports information from information processing unit 140 to the driver of vehicle body unit 210. HMI unit 230 reports, for example, emergency information contained in packets received by means of reception unit 120 to the driver of vehicle body unit 210.

Packet forwarding in the communication system that is made up of a plurality of communication apparatuses 100 is next described.

Figure 6:
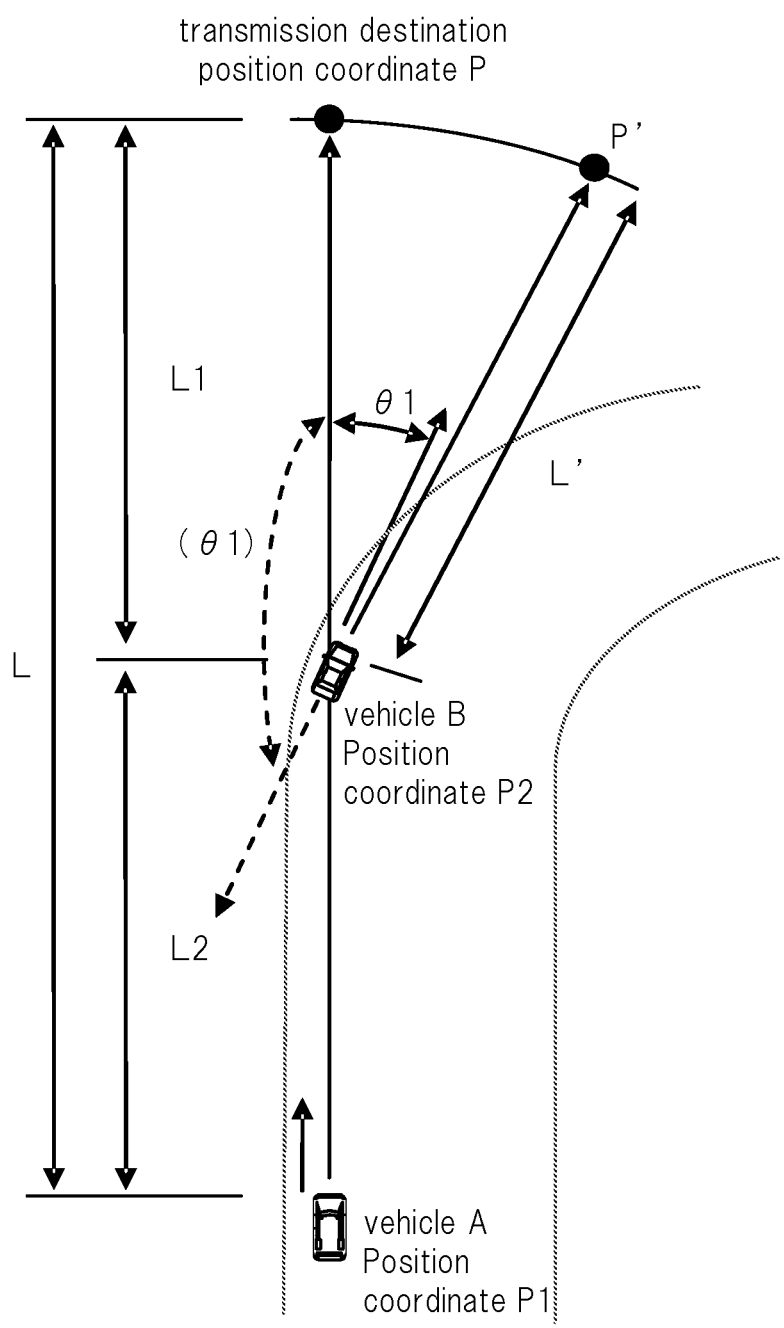
FIG. 6 is a view relating to packet forwarding of the communication system in the first exemplary embodiment.

FIG. 6 is a view relating to the forwarding of packets of the communication system that is made up of vehicles A and B in which communication apparatuses 100 are installed. FIG. 6 shows transmitting vehicle A that is the transmission origin device that transmits packets and receiving vehicle B that receives the packets from vehicle A.

In this example, the positional coordinates of vehicle A that is before the curve of the road are P1, the positional coordinates of vehicle B that is at a position at the start of the curve are P2, and the coordinates of the transmission destination of packets are P. In addition, the forwarding distance between positional coordinates P1 of vehicle A and transmission destination coordinates P is L, the remaining distance between vehicle B and transmission destination coordinates P1 is L1, and the arrival distance between vehicle A and vehicle B is L2. The angular difference between the vector of the transmission direction from vehicle A to transmission destination positional coordinates P and the vector in the traveling direction of vehicle B is θ1.

In the present exemplary embodiment, packets that contain forwarding information that indicates transmission origin position P1 and transmission destination position P are transmitted from communication apparatus 100 of vehicle A. As a result, the forwarding information that is transmitted from communication apparatus 100 of vehicle A includes the transmission direction of the packets that is determined based on transmission origin position P1 and transmission destination position P. In addition, in the present exemplary embodiment, the transmission direction of packets is the same as the traveling direction of vehicle A that is the transmission origin device. As a result, the forwarding information that is transmitted from communication apparatus 100 of vehicle A contains the transmission direction of packets and the traveling direction of vehicle A.

Communication apparatus 100 of vehicle B receives the packets from vehicle A. Communication apparatus 100 of vehicle B further acquires positional information that indicates vehicle position P2 of vehicle B and traveling direction information that indicates the traveling direction of vehicle B from positional information acquisition unit 110.

Communication apparatus 100 of vehicle B determines the transmission direction of packets that is determined based on transmission origin position P1 and transmission destination position P that are indicated by the forwarding information contained in the received packets and calculates forwarding angle θ1 formed by the transmission direction that was determined and the traveling direction of vehicle B.

Communication apparatus 100 of vehicle B then judges whether this forwarding angle θ1 exceeds the angle threshold value θ. In the present exemplary embodiment, communication apparatus 100 of vehicle B judges whether the conditions of the next formula are satisfied.

$$\theta 1 < \theta \text{ or } (180 - \theta 1) < \theta \quad \text{Formula 1}$$

When the conditions of Formula 1 are not satisfied, i.e., when forwarding angle θ1 exceeds angle threshold value θ, communication apparatus 100 of vehicle B does not implement packet forwarding.

On the other hand, when the conditions of Formula 1 are satisfied, i.e., when forwarding angle θ1 does not exceed angle threshold value θ, communication apparatus 100 of vehicle B determines that vehicle B is on the transmission direction side of vehicle A.

Communication apparatus 100 of vehicle B calculates remaining distance L1 between the vehicle position P2 that is indicated in the positional information and transmission destination position P that is indicated in the forwarding information and forwarding distance L between transmission origin position P1 and transmission destination position P that are indicated in the forwarding information.

Communication apparatus 100 of vehicle B then judges whether remaining distance L1 falls below forwarding distance L (L1<L). If remaining distance L1 is equal to or greater than forwarding distance L at this time, communication apparatus 100 of vehicle B does not implement packet forwarding.

On the other hand, if remaining distance L1 is less than forwarding distance L, communication apparatus 100 of vehicle B determines that vehicle B is present on the transmission direction side of vehicle A. Communication apparatus 100 of vehicle B next judges whether the vehicle position P2 has arrived at transmission destination position P.

Communication apparatus 100 of vehicle B calculates arrival distance L2 between transmission origin position P1 that is indicated in the forwarding information and vehicle position P2 that is indicated in the positional information and judges whether arrival distance L2 falls below forwarding distance L (L2<L). If forwarding distance L2 is equal to or greater than forwarding distance L, communication apparatus 100 of vehicle B does not implement packet forwarding.

On the other hand, if forwarding distance L2 falls below forwarding distance L, communication apparatus 100 of vehicle B determines that vehicle B has not arrived at transmission destination position P. Communication apparatus 100 of vehicle B next judges whether vehicle B is present on the same road as vehicle A. Here, the altitude of vehicle A is assumed to be P1h, the altitude of vehicle B is assumed to be P2h, and the altitude threshold value is assumed to be H.

Communication apparatus 100 of vehicle B calculates the forwarding altitude difference (|P1h−P2h|) between altitude P1h of the transmission origin position that is indicated in the forwarding information and altitude P2h of the vehicle position that is indicated in the positional information, and judges whether altitude threshold value H falls below the forwarding altitude difference (|P1h−P2h|<H). If the forwarding altitude difference is equal to or greater than the altitude threshold value H, communication apparatus 100 of vehicle B does not implement packet forwarding.

On the other hand, if the forwarding altitude difference falls below altitude threshold value H, communication apparatus 100 of vehicle B determines that vehicle B is present on the same road as vehicle A and determines that its own vehicle position is within the forwarding area.

At this time, communication apparatus 100 of vehicle B extracts, as corrected position P' from among the positions on a circle that is separated by remaining distance L' (=L−L2) from vehicle position P2, a position that is specified based on the traveling direction of vehicle B. In other words, communication apparatus 100 of vehicle B calculates corrected position P' that is separated by remaining distance L' (=L−L2) from vehicle position P2 for the traveling direction of vehicle B.

Corrected position P' in this case is ahead of vehicle B because the traveling direction of vehicle B is in the forward direction of the traveling direction of vehicle A, but is behind vehicle B when the traveling direction of vehicle B is the opposite direction of the traveling direction of vehicle A. Accordingly, communication apparatus 100 of vehicle B extracts as corrected position P' a position that is separated by remaining distance L' (=L−L2) from vehicle position P2 for, of the traveling direction of vehicle B or the direction opposite the traveling direction, the direction that is closer to the transmission direction of packets.

Communication apparatus 100 of vehicle B then both changes transmission destination position P that is indicated by the forwarding information of the packets to corrected position P' and changes transmission origin position P1 that is indicated by the forwarding information to vehicle position P2 that is indicated by the positional information. Communication apparatus 100 of vehicle B then transmits the packets that contain the forwarding information that follows these changes.

When it is determined in the present exemplary embodiment that the traveling direction of vehicle B is the direction opposite the traveling direction of vehicle A, control may be implemented such that packet forwarding is not carried out. An example of the format of packets that are transmitted from vehicle A and vehicle B is next briefly described with reference to the accompanying figures.

Figure 7:
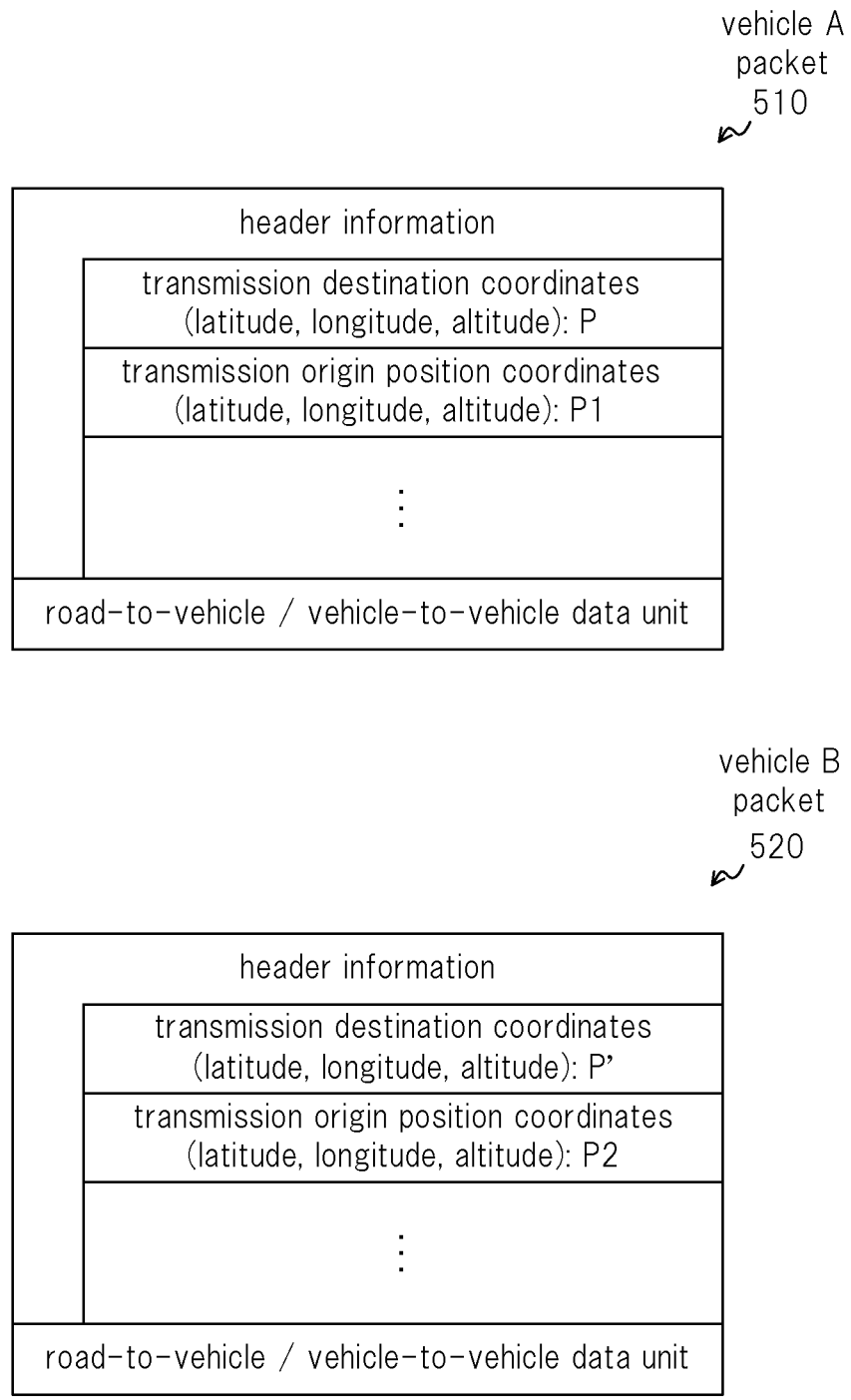
FIG. 7 shows examples of packet format.

FIG. 7 shows an example of vehicle A packet 510 that is transmitted from vehicle A and vehicle B packet 520 that is transmitted from vehicle B.

Fields are provided for storing the transmission destination coordinates and transmission origin position coordinates as forwarding information in the header information of each of vehicle A packet 510 and vehicle B packet 520.

Position coordinate P that is the transmission destination position for specifying the transmission destination of a packet is stored in the transmission destination coordinates of vehicle A packet 510, and position coordinate P1 of vehicle A that is the position of the transmission origin device is stored in the transmission origin position coordinate.

Position coordinate P' that is the corrected position that was extracted by information processing unit 140 is stored in the transmission destination coordinate of vehicle B packet 520, and position coordinate P2 of vehicle B is stored in the transmission origin position coordinate.

The operation of communication apparatus 100 is next described.

Figure 8:
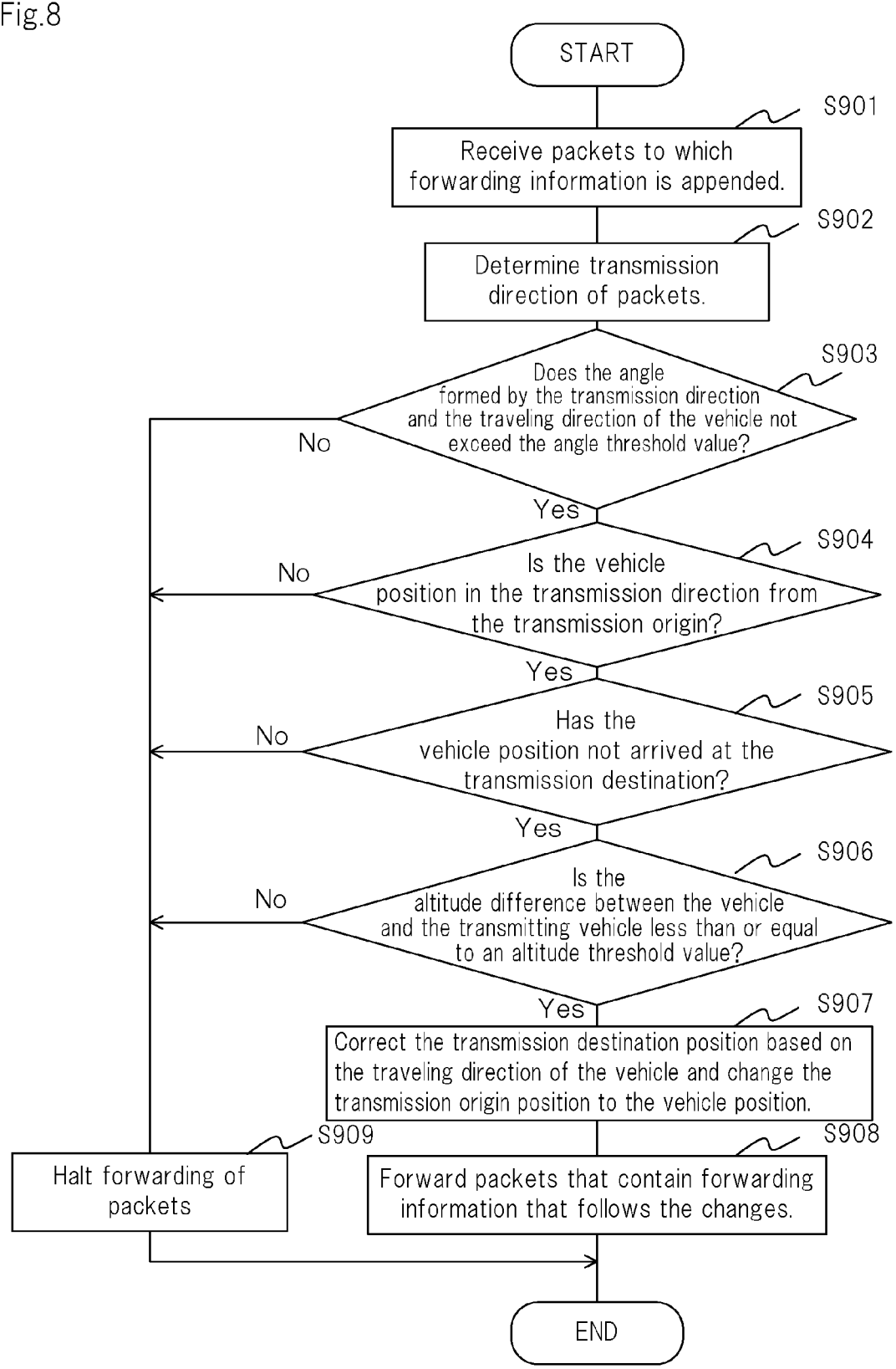
FIG. 8 is a flow chart showing an example of the flow of processes of the communication method in communication apparatus 100.

FIG. 8 is a flow chart showing an example of the flow of processing of the communication method in communication apparatus 100.

Reception unit 120 first receives, from a transmission origin device, packets that contain forwarding information in which the transmission origin position and transmission destination position are indicated (Step S901). Communication control unit 130 then determines the transmission direction of the packets based on the transmission origin position and transmission destination position that are indicated by the forwarding information of the packets that were received (Step S902).

Subsequently, communication control unit 130 judges whether the forwarding angle that is formed by the transmission direction of packets that has been determined and the traveling direction of vehicle unit 200 that is indicated by the traveling direction information from positional information acquisition unit 110 satisfies the conditions of Formula 1 (Step S903).

If the conditions of Formula 1 are not satisfied, i.e., if the angle threshold value is exceeded, communication control unit 130 determines that its own vehicle position is not contained in the forwarding area and prevents the forwarding of packets (Step S909).

On the other hand, if the conditions of Formula are satisfied, communication control unit 130 judges whether its own vehicle position is on the transmission direction side from the transmission origin device. In the present exemplary embodiment, communication control unit 130 judges whether the remaining distance between the transmission destination position and its own vehicle position falls below the forwarding distance between the transmission destination position and the transmission origin position (Step S904).

When the remaining distance is equal to or greater than the forwarding distance, communication control unit 130 then determines that its own vehicle position is not on the transmission direction side from the transmission origin device and proceeds to Step S909.

If the remaining distance falls below the forwarding distance, communication control unit 130 determines that its own vehicle position is on the transmission direction side from the transmission origin device. Communication control unit 130 next judges whether its own vehicle position has arrived at the transmission destination position. In the present exemplary embodiment, communication control unit 130 judges whether the arrival distance between the transmission origin position and its own vehicle position falls below the forwarding distance (Step S905).

When the arrival distance of packets is equal to or greater than the forwarding distance, communication control unit 130 determines that its own vehicle position has arrived at the transmission destination and proceeds to Step S909.

On the other hand, if the arrival distance of packets falls below the forwarding distance, communication control unit 130 determines that its own vehicle position has not arrived at the transmission destination. Communication control unit 130 next judges whether its own vehicle is on the same road as the vehicle of the transmission origin device. In the present exemplary embodiment, communication control unit 130 judges whether the forwarding altitude difference between the altitude of the transmission origin position and the altitude of its own vehicle position falls below an altitude threshold value (Step S906).

If the forwarding altitude difference of packets is equal to or greater than the altitude threshold value, communication control unit 130 determines that its own vehicle is not on the same road as the vehicle of the transmission origin device and proceeds to Step S909.

On the other hand, if the forwarding altitude difference of packets falls below the altitude threshold value, communication control unit 130 determines that its own vehicle is on the same road as the vehicle of the transmission origin device. Communication control unit 130 then determines that its own vehicle position is contained within the forwarding area.

Information processing unit 140 next extracts as the corrected position among the positions on a circle that is separated by the remaining distance from the position of its own vehicle, a position that is specified based on the traveling direction of vehicle unit 200. Transmission unit then both changes the forwarding destination position that is indicated by the forwarding information to the corrected position and changes the transmission origin position that is indicated by the forwarding information to its own vehicle position (Step S907).

Transmission unit 150 then transmits packets that contain the forwarding information that follows these changes (Step S908), and the series of processes of the communication method in communication apparatus 100 then ends.

An example in which a plurality of communication apparatuses 100 correct the forwarding information of packets and thus successively forward the packets according to the road line is next described with reference to FIGS. 9 to 11.

Figure 9:
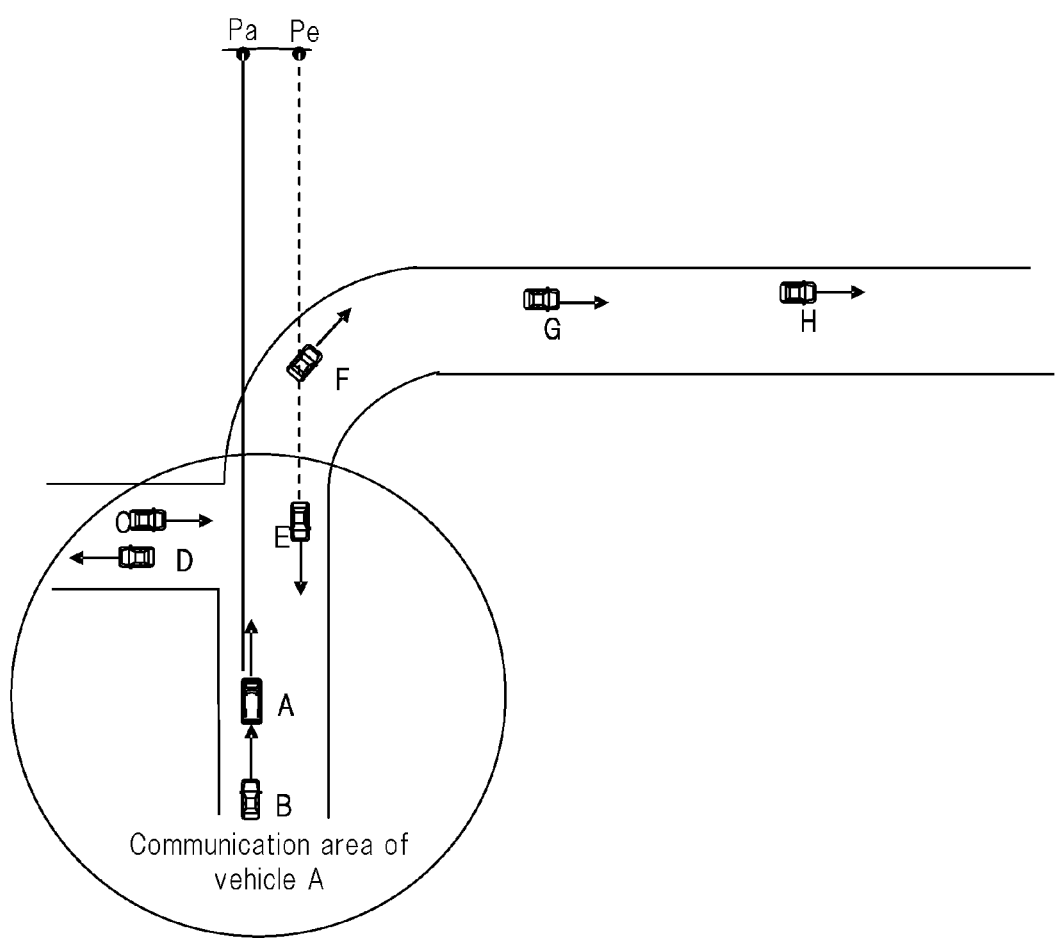
FIG. 9 is a conceptual view showing an example in which the transmission destination position of forwarding information is changed by relay vehicle E that is present in the communication area of vehicle A that is the transmission origin device.

FIG. 9 is a conceptual view showing an example in which the transmission destination position of forwarding information is changed by relay vehicle E that is in the communication area of transmitting vehicle A. In this example, it is assumed that communication apparatuses 100 are installed in each of vehicles A to H.

Transmitting vehicle A transmits packets in which position coordinate Pa is indicated in the transmission destination position of the forwarding information. At this time, relay vehicles B through E receive the packets from transmitting vehicle A, but as a result of judging by each of communication control units 130, only relay vehicle E implements forwarding of the received packets.

In this case, relay vehicle E changes position coordinate Pa that is indicated in the transmission destination position of the forwarding information of the received packets to corrected position coordinate Pe that was specified by information processing unit 140 and transmits the received packets.

Figure 10:
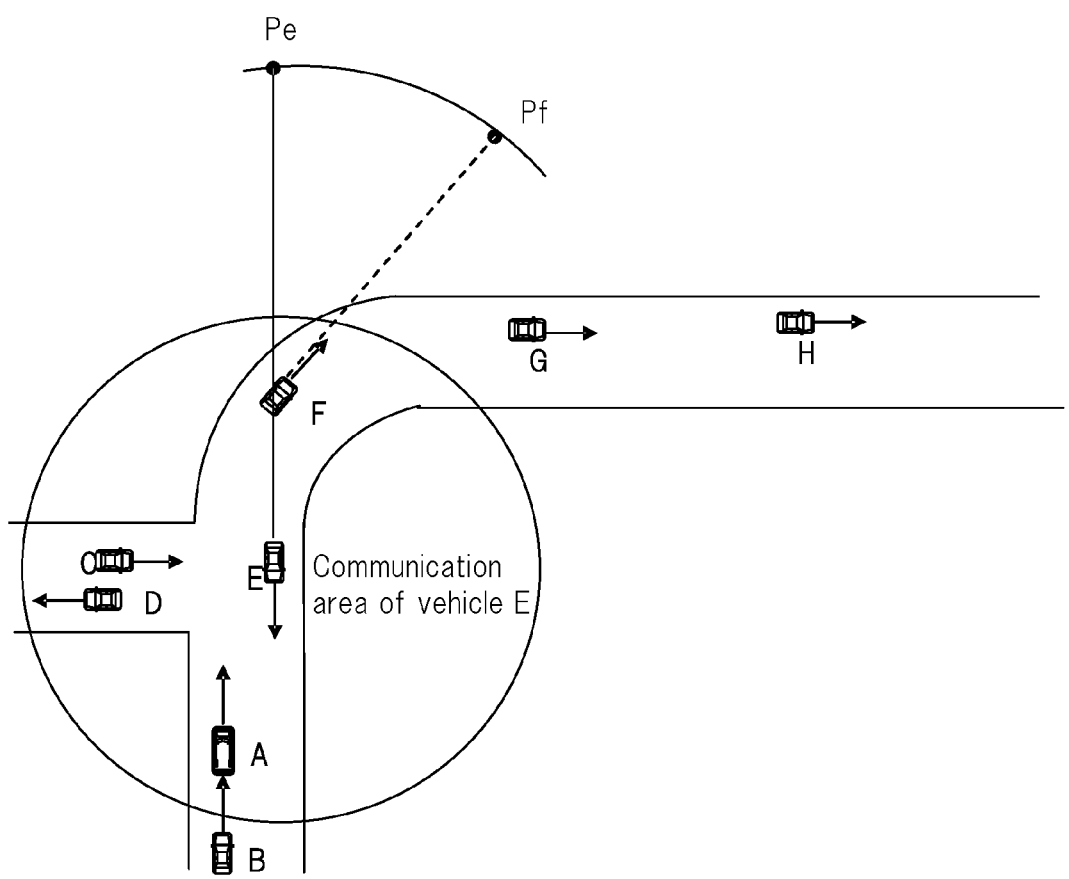
FIG. 10 is a conceptual view showing an example in which the transmission destination position of forwarding information is changed by relay vehicle F that is present in the communication area of relay vehicle E.

FIG. 10 is a conceptual view showing an example in which the transmission destination position of the forwarding information is changed by relay vehicle F that is in the communication area of relay vehicle E.

Relay vehicle E transmits packets in which position coordinate Pe is indicated in the transmission destination position of the forwarding information. At this time, relay vehicles A, C, D, and F receive packets from relay vehicle E, but as a result of judging by each of communication control units 130, only relay vehicle F implements forwarding of the received packets.

In this case, relay vehicle F changes position coordinate Pe that is indicated in the transmission destination position of the forwarding information of the received packets to corrected position coordinate Pf that is specified by information processing unit 140 and transmits the received packets.

Figure 11:
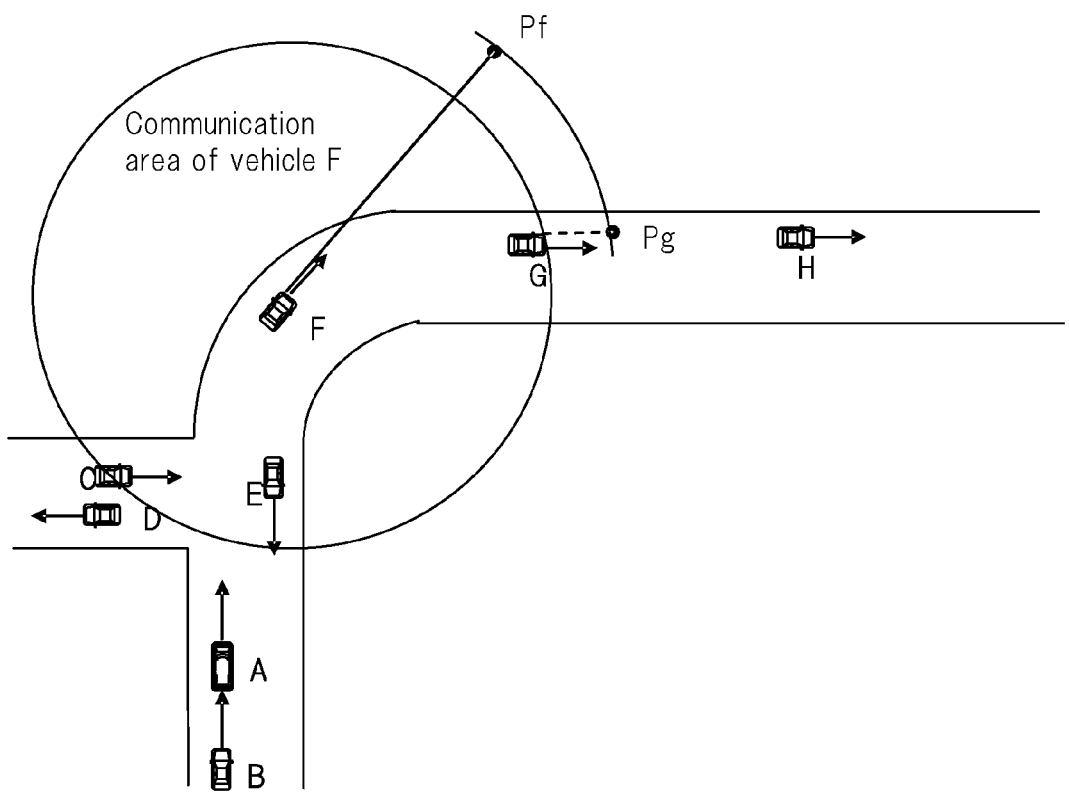
FIG. 11 is a conceptual view showing an example in which the transmission destination position of forwarding information is changed by relay vehicle G that is present in the communication area of relay vehicle F.

FIG. 11 is a conceptual view showing an example in which the transmission destination position of the forwarding information is changed by relay vehicle G that is in the communication area of relay vehicle F.

Relay vehicle F transmits packets in which position coordinate Pf is indicated in the transmission destination position of the forwarding information. At this time, relay vehicles C, E, and G receive the packets from relay vehicle F, but as a result of judging by each of communication control units 130, only relay vehicle G implements forwarding of the received packets.

At this time, relay vehicle G changes position coordinate Pf that is indicated in the transmission destination position of the forwarding information of the received packets to corrected position coordinate Pg that is specified by information processing unit 140 and transmits the received packets.

As a result, even when transmitting vehicle A has set a transmission destination position that differs from the road line, the communication system of the present exemplary embodiment is able to implement packet forwarding according to the road line by each of communication apparatuses 100 of relay vehicles E through G while preventing unnecessary forwarding of packets.

According to the first exemplary embodiment, positional information acquisition unit 110 acquires positional information that indicates its own vehicle position that is the current position of communication apparatus 200 and traveling direction information that indicates the traveling direction of vehicle unit 200. In addition, reception unit 120 receives from the transmission origin device packets that include forwarding information in which are indicated the position of the transmission origin device of the packets and the position of the transmission destination for specifying the transmission destination of the packets.

Communication control unit 130 further judges, based on the positional information from positional information acquisition unit 110 and the forwarding information of packets received by reception unit 120, whether its own vehicle position is contained within the forwarding area from the position of the transmission origin device to the position of the transmission destination. If communication control unit 130 determines that its own vehicle position is not contained within the forwarding area, communication control unit 130 halts the forwarding of packets that are received by reception unit 120.

In this way, communication apparatus 100 is able to prevent the unnecessary forwarding of received packets.

When the forwarding of packets is permitted in the first exemplary embodiment, information processing unit 140 extracts as the corrected position a position that is specified based on the traveling direction of vehicle unit 200 among positions on a circle separated from its own vehicle position by the remaining distance between the position of the transmission destination of packets and its own vehicle position. In addition, transmission unit 150 changes the transmission destination position that is indicated by the forwarding information of packets for which forwarding has been permitted to the corrected position, and further, changes the position of the transmission origin device that is indicated by the forwarding information to its own vehicle position and transmits the packets that contain the forwarding information that follows these changes.

In this way, as long as the forwarding of packets has been permitted, communication apparatus 100 is able to change the position of the transmission destination that is indicated in the forwarding information of packets to a corrected position that is specified based on the traveling direction of vehicle unit 200 and transmit packets of this altered forwarding information. As a result, communication apparatus 100 is able to carry out packet forwarding according to the road line even when receiving packets in which a transmission destination has been set by the transmission origin communication apparatus that does not agree with the road line.

As a result, communication apparatus 100 is able to correct the transmission direction of packets according to the road line without using road line information such as map information while preventing unnecessary forwarding of packets. As a result, the load required for forwarding processing can be limited because communication apparatus 100 no longer needs to use road line information to carry out the complex process of matching a designated forwarding area and a road line.

In addition, even if communication apparatus 100 of the transmitting vehicle should designate, as the designated area, a forwarding area of a fixed distance in a fixed direction from its own vehicle, the relay vehicle corrects the position of the transmission destination of packets according to the traveling direction of its own vehicle unit 200. As a result, communication apparatus 100 of the transmitting vehicle does not need to set a designated area that takes the road line into consideration when transmitting packets, whereby information can be delivered to the area for which delivery was originally desired by simple settings.

In the first exemplary embodiment, moreover, communication control unit 130 determines the transmission direction of packets based on the position of the transmission origin device and the position of the transmission destination that are indicated in the forwarding information, and when the angle formed by this transmission direction and the traveling direction of vehicle unit 200 exceeds the angle threshold value, prevents forwarding of received packets.

In this way, when the traveling direction of vehicle unit 200 is perpendicular to the transmission direction of packets in the vicinity of an intersection in which roads intersect perpendicularly, communication apparatus 100 determines that vehicle unit 200 is traveling on a road that is not subject to a designated area and is able to prevent the forwarding of packets.

In the first exemplary embodiment, when the remaining distance from its own vehicle position to the position of the transmission destination is equal to or greater than the forwarding distance between the position of the transmission origin device and the position of the transmission destination, and when the arrival distance between the position of the transmission origin device and its own vehicle position is equal to or greater than the forwarding distance, communication control unit 130 determines that its own vehicle position is not contained within the area from the position of the transmission origin device to the transmission destination position. Accordingly, communication apparatus 100 is able to prevent the forwarding of packets when its own vehicle position is not between the position of the transmission origin device and the position of the transmission destination.

Still further, in the first exemplary embodiment, communication control unit 130 determines not to forward packets when the difference between the altitude of vehicle unit 200 and the altitude of the vehicle of the transmission origin device exceeds an altitude threshold value. In this way, communication apparatus 100 is able to prevent forwarding of packets when this vehicle unit 200 is not on the same road as the vehicle that is the transmission origin device.

In the first exemplary embodiment, moreover, information processing unit 140 specifies as the corrected position a position that is separated by the remaining distance from its own vehicle position for, of the traveling direction of vehicle unit 200 and the direction opposite to the traveling direction, the direction that is closer to the transmission direction of packets. In this way, communication apparatus 100 is able to specify, as the corrected position, a position that is separated by the remaining distance from its own vehicle position for the transmission direction and the opposite direction even when, for example, the vehicle is traveling in the direction opposite the transmission direction of packets.

Still further, although an example was described in the first exemplary embodiment in which a transmitting vehicle transmits packets to vehicles ahead that are in the traveling direction of its own vehicle, the transmitting vehicle may also transmit packets to vehicles behind its own vehicle.

For example, in the safe driving support system in vehicle-to-vehicle communication, each vehicle communicates safe driving support information indicating the state of its own vehicle to surrounding vehicles, and upon perceiving the danger of an accident, such as a collision based on this safety support information, the receiving vehicles report this danger to the driver. In this case, the transmitting vehicle normally transmits safe driving support information to vehicles ahead of its own vehicle to report the presence of its own vehicle. On the other hand, it is also desirable to convey information from the transmitting vehicle to rearward vehicles to prevent rear-end collisions resulting from sudden stops.

Accordingly, a transmitting vehicle should normally set the transmission destination of packets to the direction ahead of its own vehicle and then switch the transmission direction of packets to the rear only when the driver steps on the brakes or upon sensing a decrease in speed that is greater than a fixed threshold value. In this way, the congestion of packets in a communication system can be reduced compared to a case in which each transmitting vehicle constantly transmits safe driving support information that indicates the state of its own vehicle to vehicles that are both ahead and behind.

In the first exemplary embodiment, a case was described that uses packets that contain forwarding information indicating the position of the transmission destination and the position of the transmission origin device, but forwarding information that includes the transmission direction of the packets may also be used.

In the second exemplary embodiment of the present invention, packets are used that include forwarding information that includes the transmission direction of packet that is set with a reference direction as reference and the position of the transmission origin device of packets. The basic configuration of communication apparatus 100 in the second exemplary embodiment is the same configuration as that of the first exemplary embodiment.

In communication apparatus 100 of a transmission origin device in the second exemplary embodiment, when information processing unit 140 supplies emergency information and transmission direction information that indicates the transmission direction of packets that has been set in advance for forwarding the emergency information, positional information acquisition unit 110 acquires the positional information that shows the current position of the transmission origin device at predetermined time intervals. Each time positional information acquisition unit 110 acquires positional information, communication control unit 130 generates forwarding information that includes the position of the transmission origin device that is indicated by the positional information and the transmission direction of packets that is indicated by the transmission direction information, and transmission unit 150 transmits packets that contain the forwarding information and emergency information at predetermined time intervals. When the forward direction of the vehicle is prescribed as the reference direction, the direction that is identical to the reference direction (the direction ahead of the vehicle) or the direction opposite the reference direction (the direction rearward of the vehicle) is used as the transmission direction of packets.

In communication apparatus 100 that receives packets at predetermined time intervals from the transmission origin device, when reception unit 120 receives packets that include emergency information and forwarding information that includes the transmission direction of packets and the position of the transmission origin device of packets, positional information acquisition unit 110 acquires traveling direction information that indicates the traveling direction of its own vehicle.

Communication control unit 130 then calculates, based on the current position of the transmission origin device that is included in the forwarding information in packets that were received by reception unit 120 and the past position of the transmission origin device included in the forwarding information in packets that were received by reception unit 120 before these packets were received, the direction in which the transmission origin device has moved from the past position to the current position, i.e., the traveling direction of the transmission origin device. This traveling direction of the transmission origin device is used as the reference direction. Communication control unit 130 can also typically be referred to as the calculation means.

Communication control unit 130 prevents the forwarding of packets if angle $\theta 1$ that is formed by the transmission direction of packets that is specified by the reference direction and the traveling direction of its own vehicle that is indicated by the traveling direction information does not satisfy the condition of Formula 1, i.e., if $\theta 1 > \theta$, or if $(180 - \theta 1) > \theta$. In addition, communication control unit 130 may discard the emergency information that is included in the packets without reporting the emergency information to the driver when it is determined that the traveling direction indicated by the traveling direction information is the direction opposite the transmission direction of the packets.

If angle θ1 satisfies Formula 1, positional information acquisition unit 110 acquires positional information that indicates the current position of its own vehicle, and transmission unit 150 changes the position of the transmission origin device that is included in the forwarding information to the position of its own vehicle that is indicated by the positional information. Transmission unit 150 then transmits the packets in which the forwarding information that follows these changes is included in the transmission direction of the packets that is specified by the traveling direction of the transmission origin device. Transmission unit 150 may also transmit these packets in the transmission direction of the packets without changing the forwarding information that is included in the packets.

Communication apparatus 100 in the second exemplary embodiment is therefore able to forward packets with the transmission direction of the packets as a reference by using forwarding information that includes the transmission direction of packets. Still further, communication apparatus 100 is able to reflect the shape of the road in the traveling direction of the transmission origin device that is calculated based on forwarding information by changing the position of the transmission origin device that is included in the forwarding information to the current position of its own vehicle. As a result, communication apparatus 100 is able to implement packet forwarding that accords with the road line. In addition, communication apparatus 100 is able to prevent unnecessary forwarding of packets by using angle threshold value θ and angle θ1 that is formed by the transmission direction of packets that is specified by the traveling direction of the transmission origin device and the traveling direction of its own vehicle.

In the second exemplary embodiment, forwarding information that includes the transmission direction of packets and the position of the transmission origin device of the packets may further include the position of the transmission destination of packets. In this case, information processing unit 140 in communication apparatus 100 of the transmission origin device supplies transmission area information that includes the transmission direction of packets and the forwarding distance (designated distance) of the packets, and positional information acquisition unit 110 acquires traveling direction information that indicates the traveling direction of the transmission origin device and positional information that indicates the position of the transmission origin device. Communication control unit 130 then finds the position of the transmission destination that is separated from the position of the transmission origin device that is indicated in the positional information by the forwarding distance of the packets that is included in the transmission area information for the transmission direction of the packets that is specified by the traveling direction of the transmission origin device that is indicated by the traveling direction information. Communication control unit 130 then generates forwarding information that further includes the position of the transmission destination and transmission unit 150 transmits the packets that include this forwarding information and emergency information.

In communication apparatus 100 that receives the packets from the transmission origin device, reception unit 120 receives the packets that include forwarding information that further includes the position of the transmission destination of the packets, whereupon positional information acquisition unit 110 acquires the positional information that indicates the current position of its own vehicle. As described in FIG. 5, communication control unit 130 then, based on the positional information and forwarding information, judges whether the current position is included in the forwarding area from the position of the transmission origin device to the position of the transmission destination, and prevents forwarding of packets if it determines that the current position is not included in the forwarding area. As a result, communication apparatus 100 is able to prevent forwarding of packets outside a forwarding area that is specified by forwarding information.

Forwarding information that includes the transmission direction of packets and the position of the transmission origin device of the packets may further include the forwarding distance from the transmission origin device to the transmission destination. The forwarding distance is the longest distance to the transmission destination. In this case, information processing unit 140 in communication apparatus 100 of the transmission origin device supplies transmission area information that includes the transmission direction of packets and the forwarding distance of packets, communication control unit 130 generates forwarding information that further includes the forwarding distance of the packets that is included in the transmission area information, and transmission unit 150 transmits packets that include this forwarding information and emergency information.

In communication apparatus 100 that receives packets from the transmission origin device, reception unit 120 receives packets that contain forwarding information that further includes the forwarding distance of the packets, whereupon positional information acquisition unit 110 acquires positional information that indicates the current position of its own vehicle. Communication control unit 130 then, based on the positional information and forwarding information, judges whether the current position is included within the forwarding area that is specified by the forwarding distance from the position of the transmission origin device to the transmission destination, as described in FIG. 5. For example, if the arrival distance between the current position indicated in the positional information and the position of the transmission origin device that is included in the forwarding information exceeds the forwarding distance that is included in the forwarding information, communication control unit 130 determines that the current position is not included within the forwarding area. Communication control unit 130 prevents the forwarding of packets if it determines that the current position is not included within the forwarding area.

Another example of the forwarding information that includes the transmission direction of packets is next described.

In the third exemplary embodiment of the present invention, packets are used that include forwarding information that includes the traveling direction of the transmission origin device that was indicated as the reference direction and the transmission direction of packets that is set with the reference direction as a reference. The basic configuration of communication apparatus 100 in the third exemplary embodiment is identical to that of the first exemplary embodiment.

In communication apparatus 100 of the transmission origin device in the third exemplary embodiment, information processing unit 140 supplies emergency information and transmission direction information as with the second exemplary embodiment, and positional information acquisition unit 110 acquires traveling direction information that indicates the traveling direction of the transmission origin device. Communication control unit 130 then generates forwarding information that includes the traveling direction of the transmission origin device that is indicated by the traveling direction information and the transmission direction of the packets that is indicated by the transmission direction information, and transmission unit 150 transmits packets that include this forwarding information and emergency information.

In communication apparatus 100 that receives the packets from the transmission origin device, reception unit 120 receives packets that contain forwarding information that includes the traveling direction of the transmission origin device that is indicated as the reference direction and the transmission direction of the packets, and positional information acquisition unit 110 acquires the traveling direction information that indicates the traveling direction of its own vehicle.

Communication control unit 130 then prevents the forwarding of packets if angle θ1 that is formed by the transmission direction of packets that is specified by the traveling direction of the transmission origin device that is included in the forwarding information and the traveling direction of its own vehicle that is indicated by the traveling direction information does not satisfy the conditions of Formula 1, i.e., if θ1>θ, or if (180−θ1)>θ. In addition, communication control unit 130 may discard the emergency information that is contained in the packets when it determines that the traveling direction indicated by the traveling direction information is the direction opposite the transmission direction of the packets.

When angle θ1 satisfies Formula 1, transmission unit 150 changes the reference direction that is included in the forwarding information from the traveling direction of the transmission origin device to the traveling direction of its own vehicle that is indicated in the traveling direction information and then transmits packets that contain the forwarding information that follows the changes in the transmission direction of the packets that is included in the forwarding information that follows the changes.

As a result, communication apparatus 100 in the third exemplary embodiment is able to carry out packet forwarding that accords with the road line by changing the reference direction contained in the forwarding information to the traveling direction of its own vehicle to change the transmission direction of the packets.

In the third exemplary embodiment, the position of the transmission origin device of the packets and the position of the transmission destination of the packets may be further included in the forwarding information that includes the transmission direction of packets and the traveling direction of the transmission origin device of the packets. In this case, in communication apparatus 100 of the transmission origin device, information processing unit 140 supplies transmission area information that includes the transmission direction of packets and the forwarding distance of the packets, and positional information acquisition unit 110 acquires traveling direction information that indicates the traveling direction of the transmission origin device and positional information that indicates the position of the transmission origin device. Communication control unit 130 then finds the position of the transmission destination that is separated from the position of the transmission origin device that is indicated by the positional information by the forwarding distance of the packets for the transmission direction of the packets and generates forwarding information that further includes the position of the transmission destination and the position of the transmission origin device, and transmission unit 150 transmits the packets that contain this forwarding information.

In communication apparatus 100 that receives the packets from the transmission origin device, when reception unit 120 receives packets that contain the forwarding information that further includes the position of the transmission origin device of packets and the position of the transmission destination of the packets, positional information acquisition unit 110 acquires the positional information that indicates the current position of its own vehicle in addition to the traveling direction information. Communication control unit 130 then, based on the positional information and forwarding information, judges whether the current position is contained within forwarding area from the position of the transmission origin device to the position of the transmission destination as described in FIG. 5, and if the current position is determined not to be within the forwarding area, prevents the forwarding of packets. As a result, communication apparatus 100 is able to prevent forwarding of packets outside the forwarding area that is specified by the forwarding information.

In addition, the forwarding information that includes the transmission direction of packets and the traveling direction of the transmission origin device of packets may further include the position of the transmission origin device of packets and the forwarding distance from the transmission origin device of packets to the transmission destination. In communication apparatus 100 of the transmission origin device in this case, when information processing unit 140 supplies transmission area information that includes the transmission direction of packets and the forwarding distance of packets, positional information acquisition unit 110 acquires traveling direction information that indicates the traveling direction of the transmission origin device and positional information that indicates the position of the transmission origin device. Communication control unit 130 then generates forwarding information that further includes the position of the transmission origin device that is indicated by the positional information and the forwarding distance of packets that is included in the transmission area information, and transmission unit 150 transmits the packets that contain this forwarding information.

In communication apparatus 100 that receives packets from the transmission origin device, when reception unit 120 receives packets that contain the forwarding information and that further contain the position of the transmission origin device and the forwarding distance of packets, positional information acquisition unit 110 acquires positional information that indicates the current position of its own vehicle. As described in FIG. 5, communication control unit 130 judges, based on the positional information and forwarding information, whether the current position is contained within the forwarding area that is specified by the forwarding distance from the position of the transmission origin device to the transmission destination. For example, if the arrival distance between the current position that is indicated by the positional information and the position of the transmission origin device that is included in the forwarding information exceeds the forwarding distance that is contained in the forwarding information, communication control unit 130 determines that the current position is not included in the forwarding area. When it has determined that the current position is not included within the forwarding area, communication control unit 130 prevents the forwarding of packets.

In the present exemplary embodiment, a case was described in which vehicle unit 200 that is an automobile is the mobile unit in which communication apparatus 100 is installed, but a train, ship, or aircraft may also be used as the mobile unit other than vehicle unit 200.

In each of the above-described exemplary embodiments, the configurations shown in the figures are simply examples and the present invention is not limited to these configurations.

This application claims the benefits of priority based on Japanese Patent Application No. 2010-001124 for which application was submitted on Jan. 6, 2010 and incorporates by citation all of the disclosures of that application. This application further claims the benefits of priority based on Japanese Patent Application No. 2011-000819 for which application was submitted on Jan. 5, 2011 and incorporates by citation all of the disclosures of that application.

EXPLANATION OF REFERENCE NUMBERS 100 communication apparatus
110 positional information acquisition unit
120 reception unit
130 communication control unit
140 information processing unit
150 transmission unit
200 vehicle unit
210 vehicle body unit
220 vehicle information acquisition unit
230 HMI unit

What is claimed is:

1. A communication apparatus that is installed in a mobile unit, comprising:
at least one hardware processor; and
a memory storing computer executable instructions configured to cause the hardware processor to implement:
  a reception unit that receives packets that are transmitted from a transmission origin device at prescribed time intervals and that contain forwarding information that includes the transmission direction of packets being set with a reference direction as a reference and the position of said transmission origin device;
  a calculation unit that calculates as said reference direction the traveling direction of said transmission origin device based on the position of the transmission origin device that is included in forwarding information in packets that are received by said reception unit and the position of the transmission origin device that is included in forwarding information in packets that were received by said reception unit before said packet were received;
  a transmission unit that transmits packets that include said forwarding information in the transmission direction of said packets;
  an acquisition unit that acquires positional information that indicates the current position of said mobile unit; and
  a judgment unit that, based on said positional information and said forwarding information, judges whether said current position is included within a range specified by a distance from the position of said transmission origin device to said transmission destination and that prevents forwarding of said packets in response to said current position is determined not to be included within said range,
wherein said forwarding information further includes the distance from the transmission origin device of said packets to the transmission destination.

2. The communication apparatus as set forth in claim 1, wherein said forwarding information further includes the position of the transmission destination of said packets, and
the judgment unit, based on said positional information and said forwarding information, judges whether said current position is included within a range from the position of said transmission origin device to the position of said transmission destination and that prevents forwarding of said packets in response to said current position is determined not to be included within said range from the position of said transmission origin device to the position of said transmission destination.

3. The communication apparatus as set forth in claim 1, wherein
the acquisition unit acquires traveling direction information that indicates the traveling direction of said mobile unit; and
the judgment unit prevents forwarding of said packets in response to an angle θ1 formed by the transmission direction of packets that is specified by the traveling direction of the transmission origin device that was calculated by said calculation unit and the traveling direction of the mobile unit that is indicated by said traveling direction information satisfies θ1>0 or (180−θ1)>θ.

4. The communication apparatus as set forth in claim 3, wherein said judgment unit discards said packets in response to the transmission direction of said packets being the opposite direction of the traveling direction of said mobile unit.

* * * * *

UNITED STATES PATENT AND TRADEMARK OFFICE
CERTIFICATE OF CORRECTION

PATENT NO. : 9,743,336 B2
APPLICATION NO. : 14/734507
DATED : August 22, 2017
INVENTOR(S) : Hideaki Takahashi It is certified that error appears in the above-identified patent and that said Letters Patent is hereby corrected as shown below:

In the Claims

Claim 3, Column 24, Line 42:
Delete "θ1>0" and insert --θ1>0--

Signed and Sealed this
Tenth Day of April, 2018

Andrei Iancu
*Director of the United States Patent and Trademark Office*